(12) United States Patent
Takano

(10) Patent No.: US 7,903,966 B2
(45) Date of Patent: Mar. 8, 2011

(54) ACCESSORY DEVICE

(75) Inventor: Hironori Takano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 12/337,126

(22) Filed: Dec. 17, 2008

(65) Prior Publication Data

US 2009/0169199 A1    Jul. 2, 2009

(30) Foreign Application Priority Data

Dec. 26, 2007    (JP) ................................ 2007-333410

(51) Int. Cl.
*G03B 11/00* (2006.01)
*H04N 5/225* (2006.01)
(52) U.S. Cl. ......................................... 396/544; 348/375
(58) Field of Classification Search .................. 396/544; 348/373–375; 439/162, 375, 376
See application file for complete search history.

(56) References Cited

U.S. PATENT DOCUMENTS

2005/0237426 A1* 10/2005 Takashima et al. ........... 348/375
2009/0128688 A1*  5/2009 Takano ......................... 348/373

FOREIGN PATENT DOCUMENTS

JP           57-29045      6/1982
JP           09-043683     2/1997

* cited by examiner

*Primary Examiner* — W. B. Perkey
*Assistant Examiner* — Minh Q Phan
(74) *Attorney, Agent, or Firm* — Cowan, Liebowitz & Latman, P.C.

(57) ABSTRACT

An accessory device of the present invention is configured to be mounted on an accessory shoe of an image pickup apparatus. The accessory device includes an insertion member configured to be inserted in an engagement space between a first engagement part and a second engagement part of the accessory shoe, an operating member configured to perform an operation for fixing the accessory device on the accessory shoe, and a moving member configured to move in a second direction intersecting with a first direction in which the insertion member is inserted in the engagement space. The moving member is provided with a protrusion part which is in contact with at least one of the first engagement part and the second engagement part so that the insertion member is not removed from the engagement space by a movement of the moving member in the second direction.

2 Claims, 17 Drawing Sheets

ACCESSORY DEVICE

BACKGROUND OF THE INVENTION

1. Field of the Invention

The present invention relates to an accessory device such as a video light and a microphone, and more particularly to an accessory device equipped with a connection mechanism which is connected to and fixed on an image pickup apparatus such as a video camera.

2. Description of the Related Art

Conventionally, various types of connection mechanisms which are configured to connect an external accessory device to an accessory shoe of a camera main body (hereinafter referred to as an "accessory shoe") to be fixed have been proposed.

The connection mechanism connected to and fixed on the accessory shoe has a function as a communication means for communicating various kinds of signals with the camera main body, in addition to a mechanical function which fixes the accessory device itself on the camera main body. Therefore, in order to ensure a reliable communication path, with regard to the connection mechanism of the accessory device, the connection position relation with the accessory shoe with high accuracy needs to be maintained.

In order to prevent the connection state between the connection mechanism of the accessory device and the accessory shoe from easily being released, for example, the following configuration is adopted as a connection mechanism.

First, in order to perform a positioning of the accessory device, a locking pin which can be removably inserted into a joint hole formed on the accessory shoe is provided. Second, a shoe locknut which sets a firm fixing state is provided by the screw connection with respect to a shoe base provided on the lower part of the accessory device which constitutes the connection mechanism and by moving in an upward and downward direction by rotation to fasten the accessory shoe.

FIG. 17 shows a main cross-sectional view of a connection mechanism in a conventional accessory device.

In FIG. 17, shoe locknut 3 is connected by a screw with respect to a shoe base 2 fixed on a lower part of a main body 1 of an accessory device. The shoe locknut 3 itself moves in an upward and downward direction by rotation of the shoe locknut 3.

A locking pin 4 inserted into a joint hole formed on an accessory shoe (not shown) is provided movably in an upward and downward direction in a through hole which is configured to pass through the shoe base 2 in an upward and downward direction. One end part 4a is connected to one end part 5a of a spring 5 in the main body 1.

A base part 5b of the spring 5 is fixed on the main body 1 and always biases the locking pin 4 in a direction where the other end part 4b protrudes outside the shoe base 2, i.e. in a direction where the other end part 4b protrudes outside the shoe base 2 and is inserted into an engagement hole formed on the accessory shoe.

A protrusion 6 passes through a lower part of the main body 1 and is positioned between the shoe locknut 3 and the spring 5. One end part 6a of the protrusion 6 protrudes outside the main body 1 in accordance with the relation of the position where it is in contact with an upper end surface of the shoe locknut 3. The other end part 6b of the protrusion 6 is provided so as to be in contact with the spring 5. When the shoe locknut 3 is rotated so as to move in an upward direction for releasing the connection, the upper end surface is in contact with the one end part 6a of the protrusion 6.

When the shoe locknut 3 is further rotated so as to move in the upward direction in this contact state, the protrusion 6 presses the spring 5 against its biasing force via the other end part 6b in the upward direction. The locking pin 4 connected to the one end part 5a of the spring 5 moves in the upward direction by the spring 5 pressed in the upward direction. As a result, the joint with the joint hole which is formed on the accessory shoe is released.

On the other hand, when the shoe locknut 3 is rotated in a direction opposite to the case described above, the shoe locknut 3 moves in a downward direction.

The spring 5 moves the protrusion 6 and the locking pin 4 in the downward direction by its elastic force. Therefore, the one end part 4b of the locking pin 4 is protruded outside the shoe base 2 and is inserted into the joint hole formed on the accessory shoe (not shown). Thus, the position relationship between the accessory device and the camera main body is set in a specific state.

In this case, in accordance with the movement of the above shoe locknut 3 in the downward direction, a part of the accessory shoe (not shown) is clipped by the shoe base 2 to be fastened. Therefore, the shoe base 2 is fixed on the accessory shoe and the accessory device is firmly fixed on the camera main body.

In other words, the locking pin 4 moves in the upward and downward direction via the elastic force of the spring 5 in conjunction with the movement of the shoe locknut 3 in the upward and downward direction. Therefore, the accessory device is positioned with respect to the camera main body by the locking pin 4 and the joint hole formed on the accessory shoe.

Reference numeral 7 denotes a plurality of signal pins which are electrically connected to each kind of signal terminals formed on the accessory shoe (not shown).

On the other hand, since the shoe locknut 3 rotates to move in the upward direction and an end surface of the shoe locknut 3 is in contact with an end surface of the main body 1, further rotation of the shoe locknut 3 is limited.

When a rotational force which moves the shoe locknut 3 in the upward direction is further added to the shoe locknut 3, a bite unnecessary for the screw connection between the shoe locknut 3 and the shoe base 2 may occurs. If the bite unnecessary for the screw connection occurs, the shoe locknut 3 can not rotate there and it may take a long time for the release of the rotation disable state in the next movement in the downward direction.

In order to avoid such an inconvenience, for example, the configuration of a stopper mechanism as disclosed in Japanese Examined Utility Model Application Publication No. 57-29045 has been proposed. This stopper mechanism (not shown) has the following configuration. In other words, it includes a C-shaped groove formed on either one of an end surface of the facing shoe locknut and an end surface of the main body 1 (a groove that is planarly formed in a C-shape where a circumferentially-formed groove is partially blocked) and a protrusion provided on the end surface of the other one. Here, when the end surface of the shoe locknut gets close to the end surface of the main body 1, the rotation of the shoe locknut stops by contact of the protrusion on an end wall part in the C-shaped groove.

By the way, according to the connection mechanism in the conventional accessory device shown in FIG. 17, the accessory device and the camera main body can maintain the relationship of the connection position with high accuracy and can be firmly connected to each other.

However, since each of the locking pin 4, the spring 5, and the protrusion 6 is an independent part, a plane area to some extent is necessary for the arrangement of the parts and the miniaturization of the connection mechanism is limited.

Since the locking pin 4 and the like are independent parts, the influence of the variation in size of each of the parts is large. For example, it is difficult to maintain the operating position of the shoe locknut 3 that is an operating member and the moving state of the locking pin 4 to be in a desired relation with high accuracy.

Furthermore, if the configuration for avoiding the bite as disclosed in Japanese Examined Utility Model Application Publication No. 57-29045 attempts to be provided as it is, it is necessary to ensure an arrangement space for the protrusion 6 or a protrusion which is in contact with an end surface of a C-shaped groove between an end surface of the shoe locknut 3 and an end surface of the main body 1.

Accordingly, as described above, in conjunction with the need of the plane area to some extent, the shape of the connection mechanism may grow in size. Therefore, it was a large problem in view of the miniaturization of devices.

On the other hand, Japanese Patent Laid-Open No. discloses that the operation of moving up and down of the locking pin is performed using a cam. However, in this configuration, a cam member other than the shoe locknut needs to be prepared. Therefore, the number of the parts can not be drastically reduced.

BRIEF SUMMARY OF THE INVENTION

The present invention provides an accessory device which is equipped with a highly reliable connection part. The present invention also provides an accessory device which is configured to be reliably connected to an accessory shoe with a simple configuration.

An accessory device as one aspect of the present invention is configured to be mounted on an accessory shoe of an image pickup apparatus. The accessory device includes an insertion member configured to be inserted in an engagement space between a first engagement part and a second engagement part of the accessory shoe, an operating member configured to perform an operation for fixing the accessory device on the accessory shoe in a state where the insertion member is inserted in the engagement space, and a moving member configured to move in a second direction intersecting with a first direction in which the insertion member is inserted in the engagement space by the operation of the operating member. The moving member is provided with a protrusion part which is in contact with at least one of the first engagement part and the second engagement part so that the insertion member is not removed from the engagement space by a movement of the moving member in the second direction.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Figure 1:
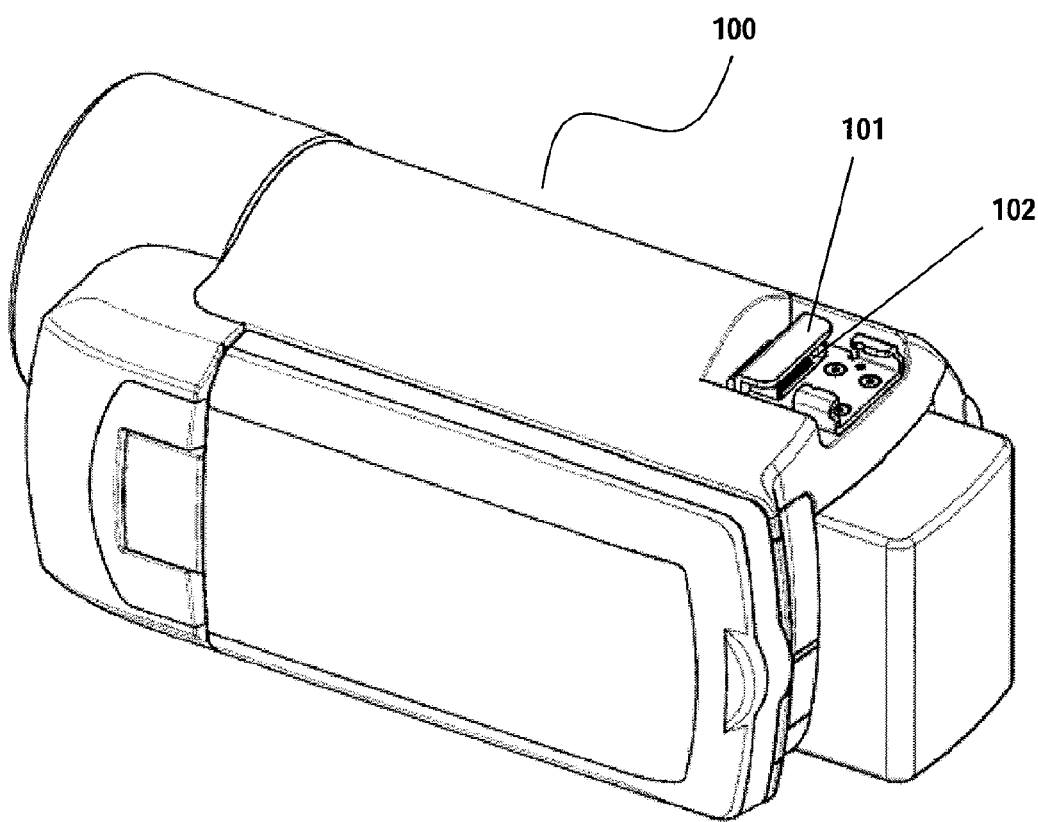
FIG. 1 is an appearance view of a video camera in the present embodiment.

FIG. 1 is an appearance view of a video camera in the present embodiment. In the present embodiment, the video camera is shown as one example of an image pickup apparatus. In the description of the present embodiment, with regard to components at a side of the video camera, each name will be preceded by the words "camera side". On the other hand, with regard to components at a side of the accessory device, each name will be preceded by the words "accessory side".

In FIG. 1, reference numeral 100 denotes a video camera main body. Reference numeral 101 denotes a camera side engagement plate. Reference numeral 102 denotes a camera side contact holding member. The detail of the configuration, the function, and the like, of the camera side engagement plate 101 and the camera side contact holding member 102 will be described later.

Figure 2:
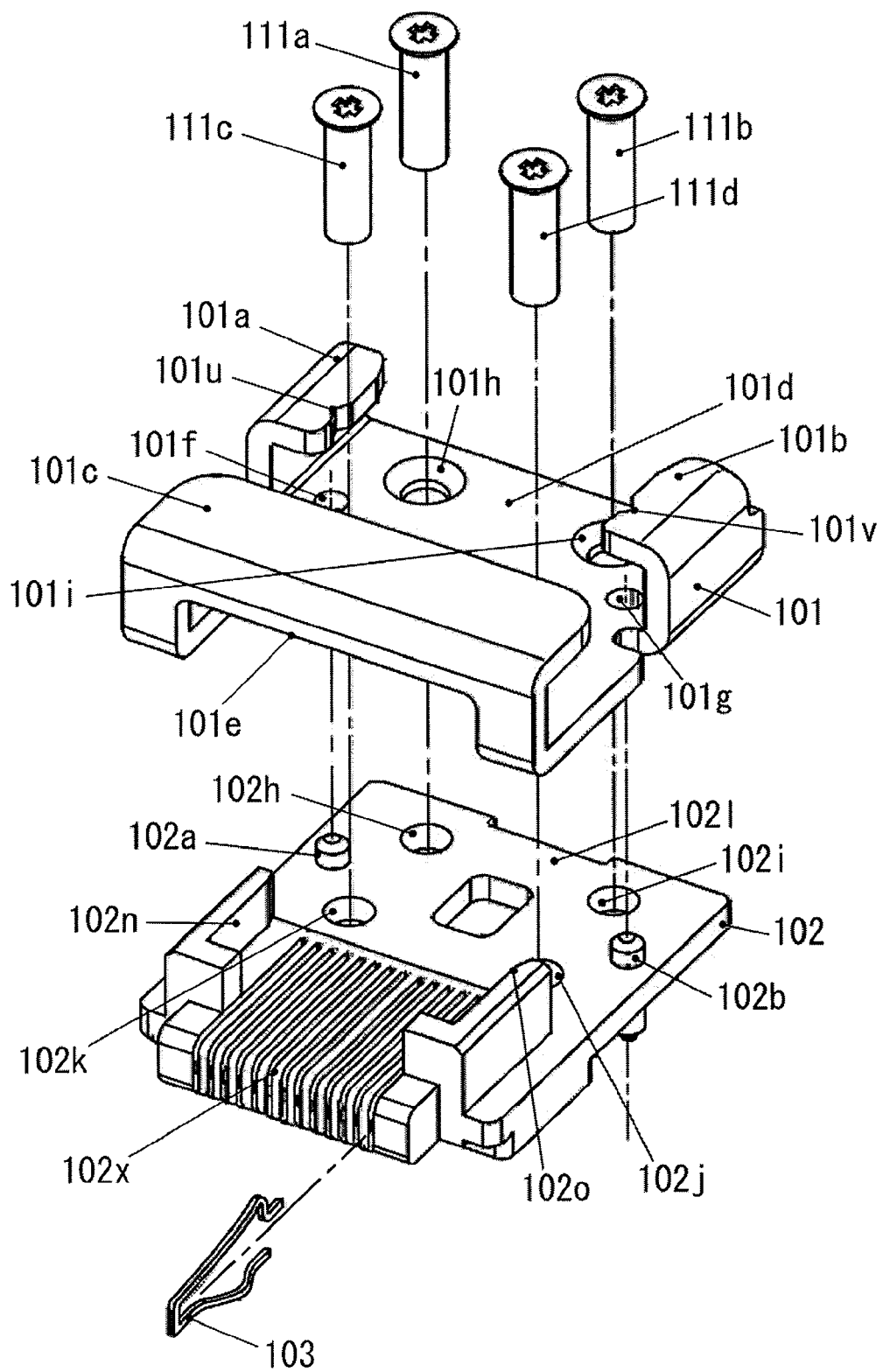
FIG. 2 is an exploded perspective view of an accessory shoe in the present embodiment.
Figure 3:
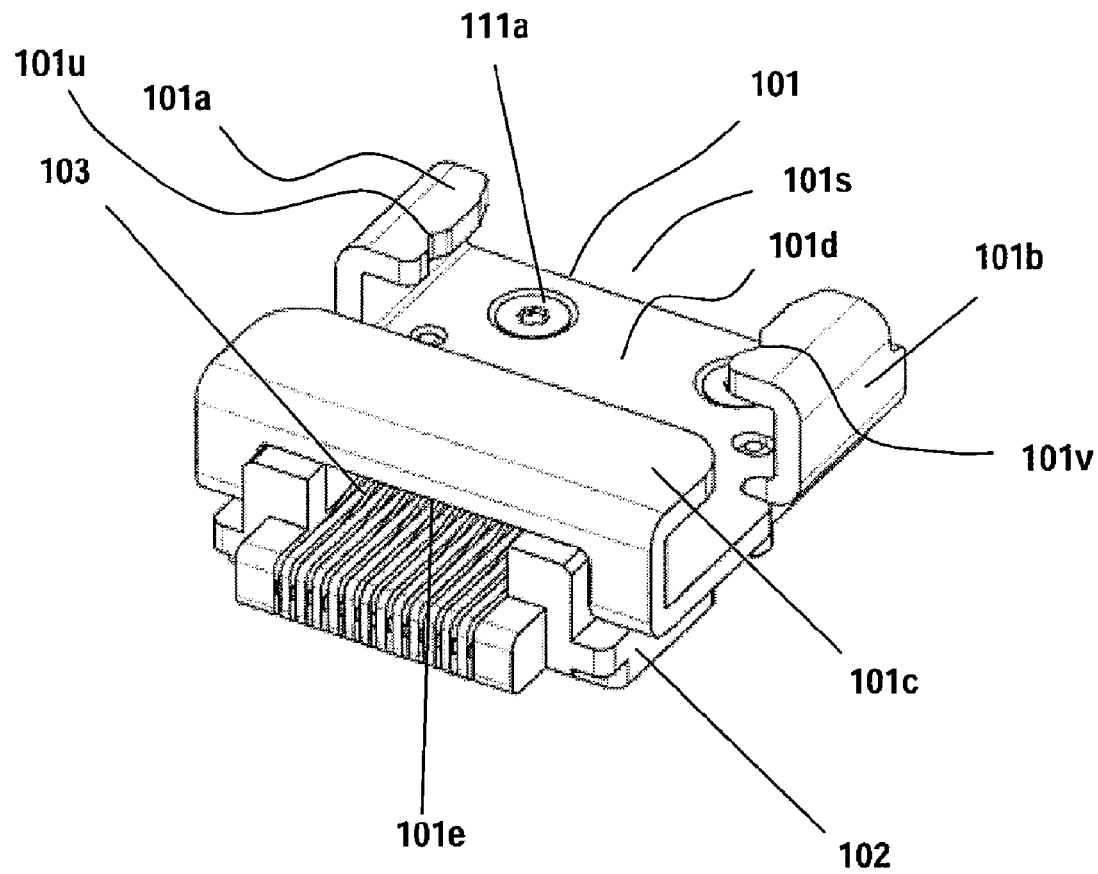
FIG. 3 is a perspective view of an accessory shoe when viewed from a front side in the present embodiment.
Figure 4:
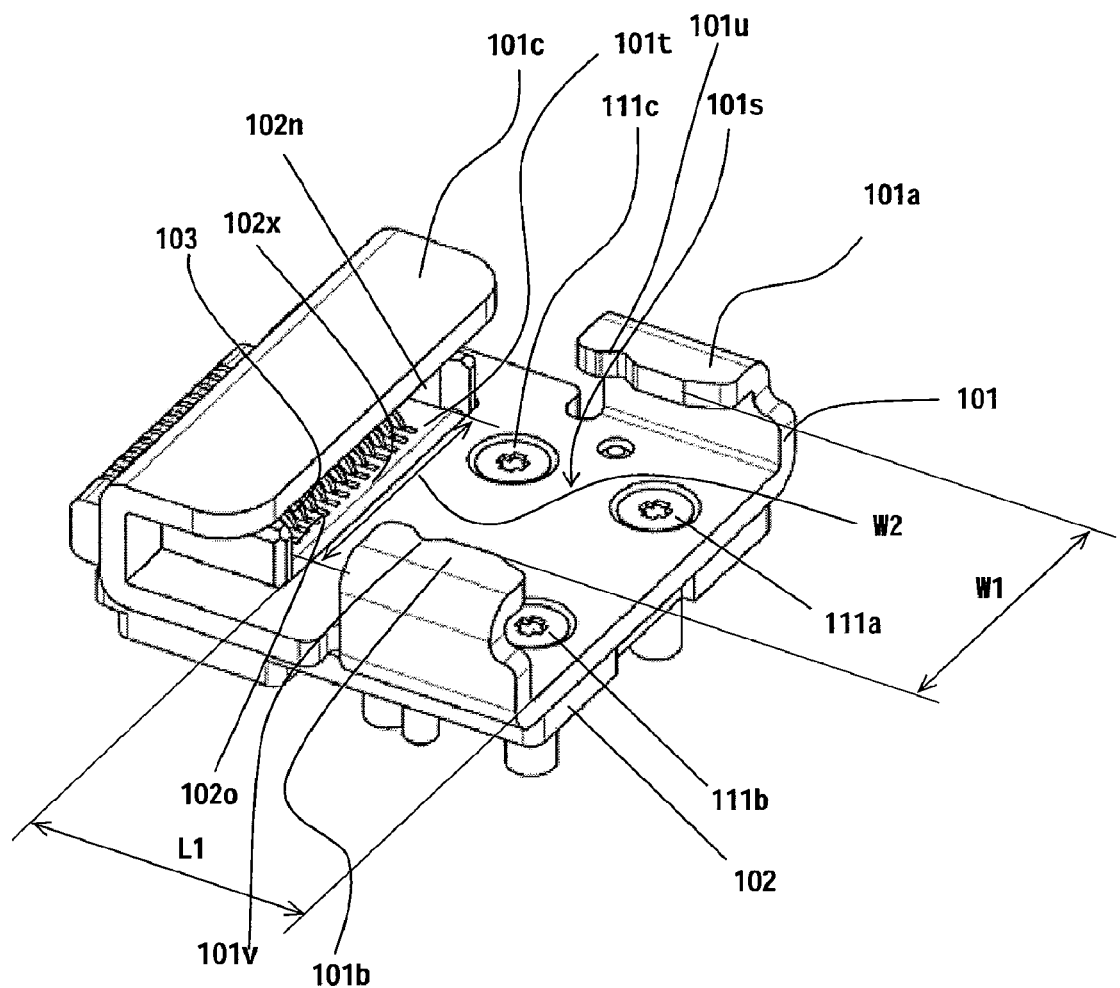
FIG. 4 is a perspective view of an accessory shoe when viewed from a back side in the present embodiment.
Figure 5:
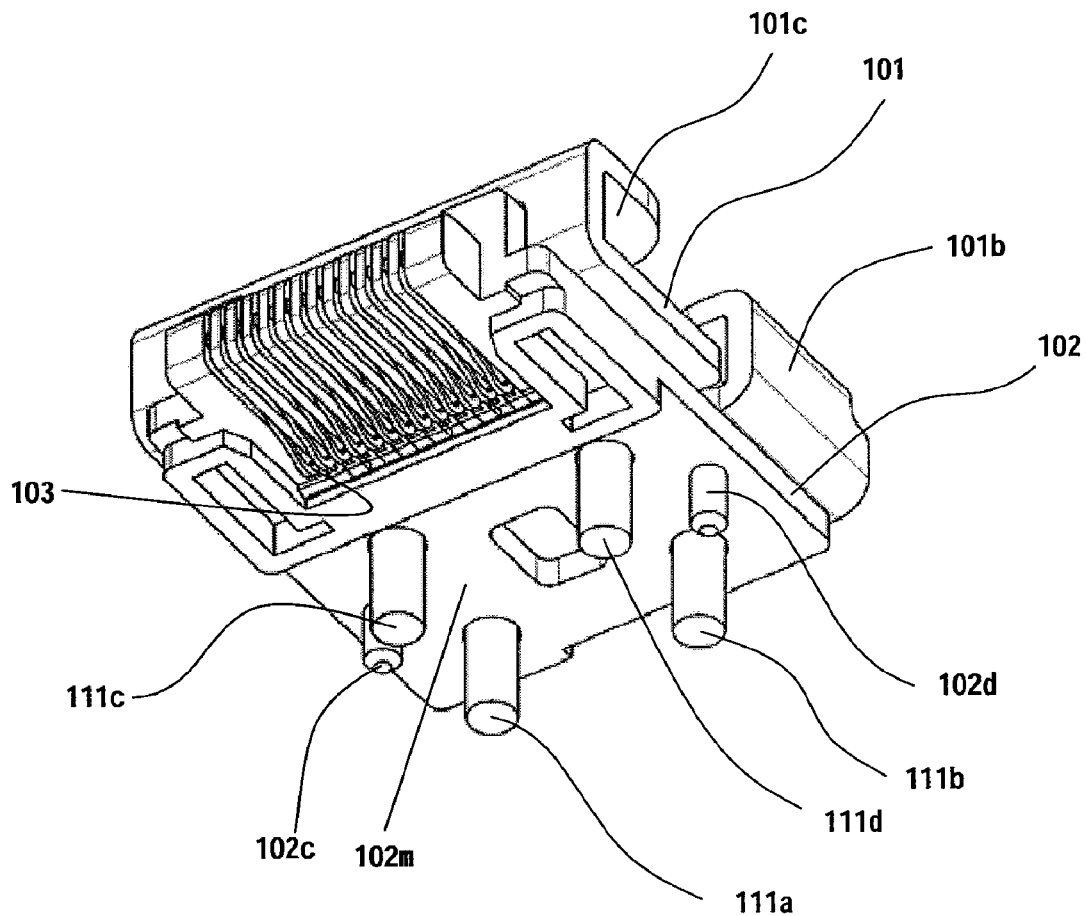
FIG. 5 is a perspective view of an accessory shoe when viewed from underneath in the present embodiment.

FIG. 2 is an exploded perspective view of an accessory shoe in the present embodiment. FIGS. 3 to 5 are perspective views of the accessory shoe in an assembling completed state. FIG. 3 is a perspective view of the accessory shoe when viewed from a front side. FIG. 4 is a perspective view of the accessory shoe when viewed from a back side. FIG. 5 is a perspective view of the accessory shoe when viewed from underneath. Thus, FIGS. 3 to 5 show the accessory shoe when viewed from different directions. The accessory shoe is attached to the video camera main body 100 in a state as shown in FIGS. 3 to 5.

Figure 6:
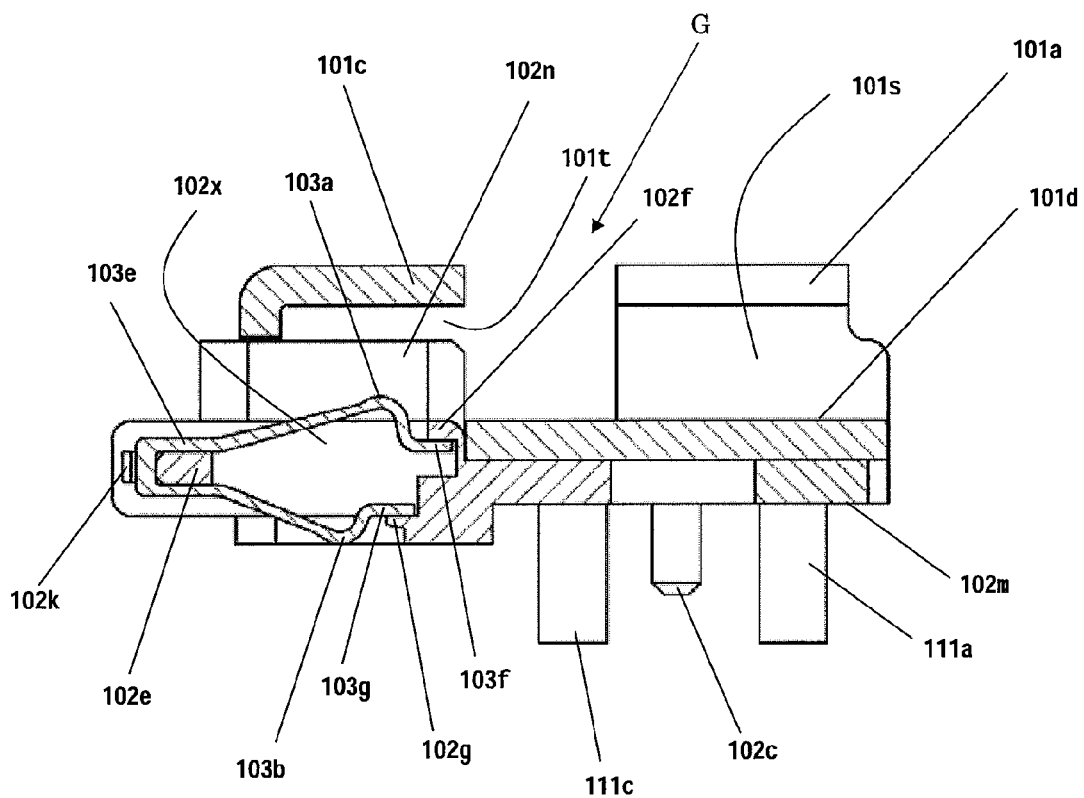
FIG. 6 is a cross-sectional view of an accessory shoe in the present embodiment.

FIG. 6 shows a cross-sectional view of the accessory shoe in the present embodiment. In the following description of the present embodiment, the left side direction of the cross section in FIG. 6 is referred to as a "front", and the right side direction in FIG. 6 is referred to as a "back". The "front" indicates an object direction of the video camera main body 100 or a mounting direction (at a mounting side) in which the accessory device is slidable to be mounted on the video camera main body 100.

In FIGS. 1 to 6, reference numeral 101 denotes a camera side engagement plate as an engagement member. The camera side engagement plate 101 is made of a steel plate such as SPCC and SUS. The camera side engagement plate 101 is integrally formed by a punching process and/or a bending process.

Reference numeral 102 denotes a camera side contact holding member. The camera side contact holding member 102 is made of a thermoplastic resin material such as PBT and PA. Generally, the camera side contact holding member 102 is integrally formed by injection molding.

Reference numeral 103 denotes a camera side contact. The camera side contact 103 is made of a metal material such as phosphor bronze or copper-titanium alloy which has superior spring characteristics and conductivity, and is integrally formed by the punching process and/or the bending process. A surface treatment such as nickel plating or gold plating is performed on the camera side contact 103. The camera side contact 103 is held by the camera side contact holding member 102.

The camera side engagement plate 101 has a planar sliding part (a mounting base surface) 101d. The camera side engagement plate 101 has a pair of camera side engagement parts (a first engagement part and a second engagement part) 101a and 101b which are positioned sandwiching a sliding space (an engagement space) 101s that is an upper side space of the sliding part 101d.

First, the camera side engagement parts 101a and 101b are bent upward with respect to the sliding part 101d. Next, the camera side engagement parts 101a and 101b bent upward is bent in parallel to the sliding part 101d so that end parts of them are protruded into the inner side of the sliding space 101s (so that the first engagement part and the second engagement part face each other).

Concave parts 101u and 101v are provided at each of inside end surfaces of the camera engagement parts 101a and 101b. A click feel is generated by an end part of a click spring 605 described later falling into the concave parts 101u and 101v.

In the following description of the present embodiment, an arrangement direction of the camera side engagement parts 101a and 101b (a direction in which the sliding space 101s is sandwiched) is referred to as a shoe width direction.

A camera side engagement part (a third engagement part) 101c is formed at a position anterior to the camera side engagement parts 101a and 101b of the camera side engagement plate 101 in a mounting direction (at a mounting side).

First, the camera side engagement part 101c is bent upward with respect to the sliding part 101d. Next, the camera side engagement part 101c bent upward is bent in parallel to the sliding part 101d so that an end part of it is protruded backward (in a direction opposite to the mounting direction, or so as to face the camera side engagement parts 101a and 101b).

An opening 101e is formed under the camera side engagement part 101c of the camera side engagement plate 101. A front part of the camera side contact holding member 102 (hereinafter referred to as "a contact holding part 102x") is inserted from under the camera side engagement plate 101 into the opening 101e.

Thus, the end part bent in parallel to the sliding part 101d of the camera side engagement part 101c (hereinafter referred to as "a bent end part") and the contact holding part 102x of the camera side contact holding member 102 are placed to face each other in an upward and downward direction.

An engagement space 101t which is connected to the sliding space 101s is formed between the bent end part of the camera side engagement part 101c and the contact holding part 102x of the camera side contact holding member 102. The contact holding part 102x of the camera side contact holding member 102 and an upper surface of a camera side contact 103 held here (a contact part 103a described later) are exposed inside the engagement space 101t through the opening 101e from outside the engagement space 101t.

A camera side connector (a connector at a side of an image pickup apparatus) which is electrically connected to an accessory side connector described later is constituted by the contact holding part 102x of the camera side contact holding member 102 and the camera side contact 103 held here.

Positioning holes 101f and 101g and fixing screw holes 101h, 101i, 101j, and 101k are formed on the sliding part 101d of the camera side engagement plate 101. The positioning holes 101f and 101g perform a positioning of the camera side engagement plate 101 and the camera side contact holding member 102 by inserting protrusions 102a and 102b formed on the upper surface of the camera side contact holding member 102 from underneath. Screws 111a, 111b, 111c, and 111d for fixing the camera side engagement plate 101 with respect to the video camera main body 100 are inserted into the fixing screw holes 101h, 101i, 101j, and 101k from above, respectively.

The camera side contact holding member 102 holds a plurality of camera side contacts 103 with the heights uniform in the shoe width direction at predetermined pitches for supplying power to the accessory device or for exchanging communication signals with the accessory device.

Partition walls are provided between adjacent camera side contacts 103 on the camera side contact holding member 102. The partition walls prevent the adjacent camera side contacts 103 from shorting circuits.

As shown in FIG. 6, a contact engagement part 102e, contact locking parts 102f and 102g, and a contact removal preventing part 102k are formed on the contact holding part 102x of the camera side contact holding member 102. The contact engagement part 102e holds the camera side contact 103 by engaging inside a crotch part 103e on the camera side contact 103 formed in a biforked shape. The contact locking parts 102f and 102g engage with end parts 103f and 103g of contact parts 103a and 103b so as to hold the contact parts (two leg parts) 103a and 103b of the camera side contact 103 in a charge stage (an elastic deformation state).

The contact part 103a is in contact with an accessory side contact 603 described later and communicates various kinds of signals with the accessory device. Therefore, the contact part 103a can obtain a stable contact pressure (a biasing force) when it is in contact with the accessory side contact 603 by being charged in a non-contact state (an initial state) with the accessory side contact 603.

On the other hand, the contact part 103b is in contact with an FPC (a flexible printed board), which is not shown, at the side of the video camera main body 100, and communicates various kinds of signals with the video camera main body 100. Therefore, the contact part 103b can obtain a stable contact pressure (a biasing force) when it is in contact with the FPC by being charged in a non-contact state with the FPC.

The contact removal preventing part 102k has a wedged cross sectional shape. It prevents the camera side contact 103 from falling from the camera side contact holding member 102 when the accessory device is attached or removed.

An upper surface 102*l* of the camera side contact holding member 102 is in contact with a lower surface of the camera side engagement plate 101. The upper surface 102*l* is provided with the protrusions 102*a* and 102*b* described above. A lower surface 102*m* of the camera side contact holding member 102 is provided with positioning protrusions 102*c* and 102*d* with respect to the video camera main body 100.

Furthermore, the camera side contact holding member 102 is provided with fixing screw holes 102*h*, 102*i*, 102*j*, and 102*k*. The screws 111*a*, 111*b*, 111*c*, and 111*d* described above are inserted into these fixing screw holes 102*h*, 102*i*, 102*j*, and 102*k*.

The upper surface 102*l* of the contact holding part 102*x* of the camera side contact holding member 102 is provided with guide wall surfaces 102*n* and 102*o*. The guide wall surfaces 102*n* and 102*o* are formed so as to sandwich a plurality of the contact parts 103*a* of the camera side contacts 103 and the engagement space 101*t* described above in the shoe width direction and so as to extend them in a frontward and backward direction.

When an accessory side contact holding member 601 described later is inserted into the engagement space 101*t* described above, the guide wall surfaces 102*n* and 102*o* guide guide wall surfaces 601*n* and 601*o* of the accessory side contact holding part 601. Thus, a displacement or a jounce between the camera side contact holding member 102 and the accessory side contact holding member 601 in the shoe width direction is avoided. In other words, the camera side contact 103 held by the camera side contact holding member 102 can be accurately in contact with the accessory side contact 603 corresponding to the camera side contact 103, which is held by the accessory side contact holding member 601.

Figure 7:
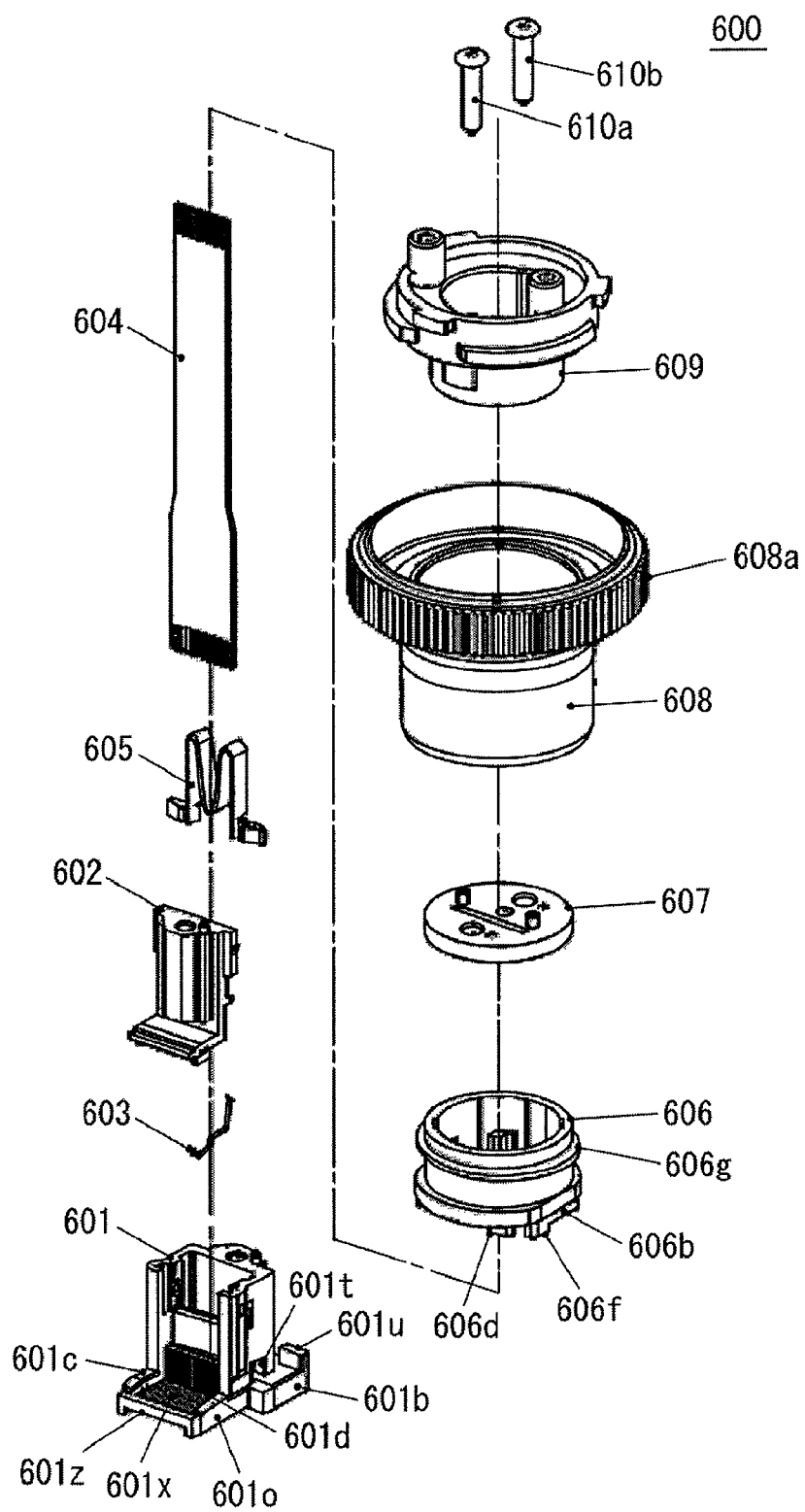
FIG. 7 is an exploded perspective view of a connection part of an accessory device in the present embodiment.
Figure 8:
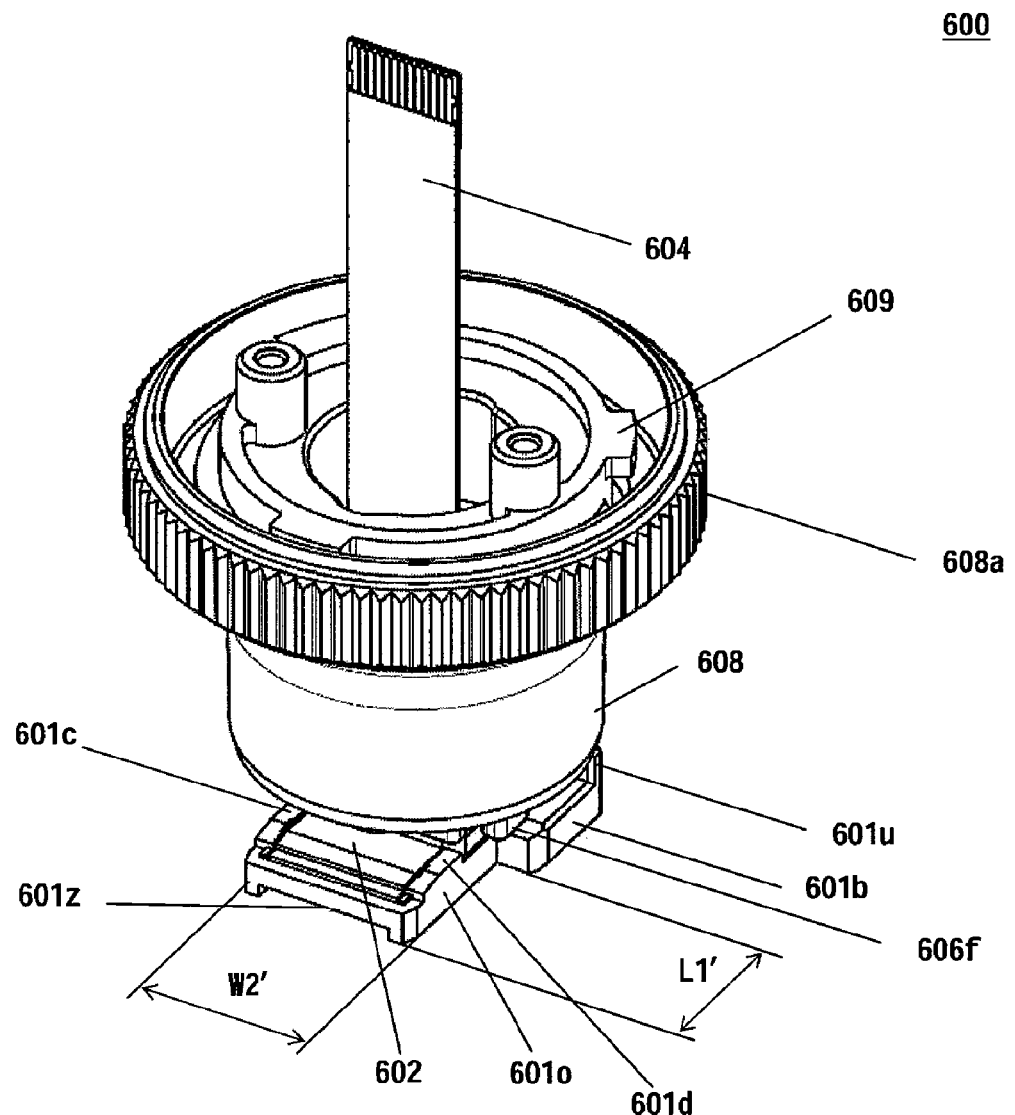
FIG. 8 is a perspective view of a connection part of an accessory device when viewed from a front side in the present embodiment.
Figure 9:
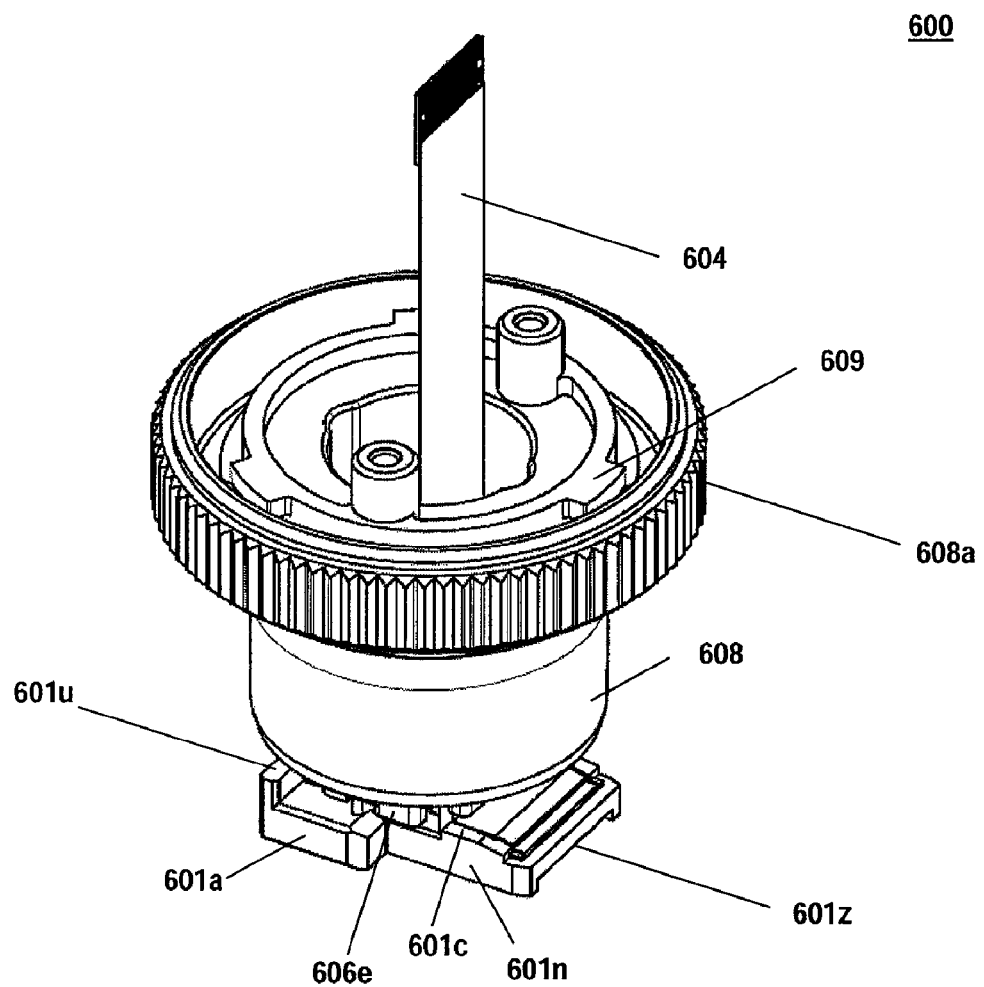
FIG. 9 is a perspective view of a connection part of an accessory device when viewed from a front side in the present embodiment.
Figure 10:
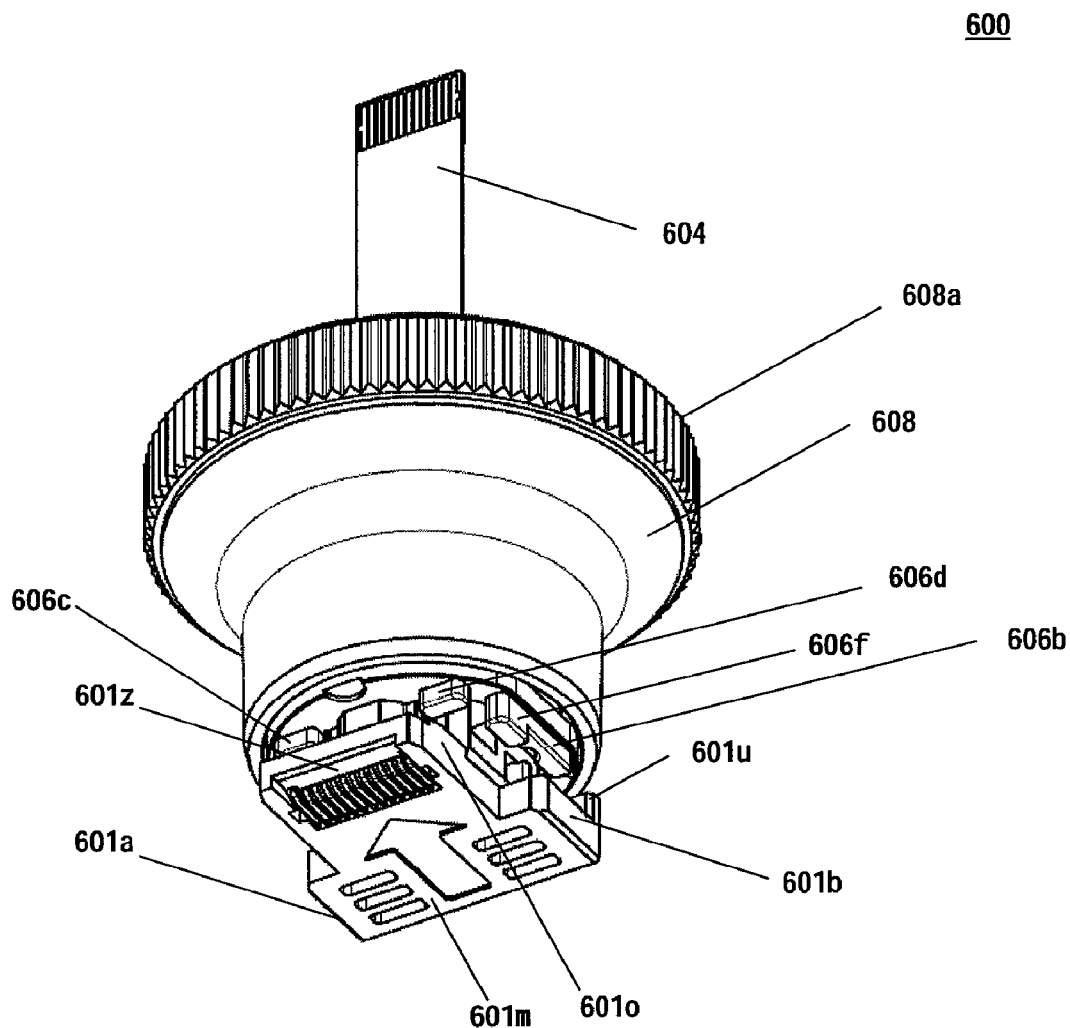
FIG. 10 is a perspective view of a connection part of an accessory device when viewed from underneath in the present embodiment.

FIG. 7 is an exploded perspective view of a connection part (a shoe mounting part) 600 of the accessory device which is mounted on the accessory shoe of the present embodiment. FIGS. 8 to 10 show the connection part 600 of the accessory device when viewed from different directions. FIGS. 8 and 9 are perspective views of the connection part 600 of the accessory device when viewed from a front side. FIG. 10 is a perspective view of the connection part 600 of the accessory device when viewed from underneath.

Figure 11:
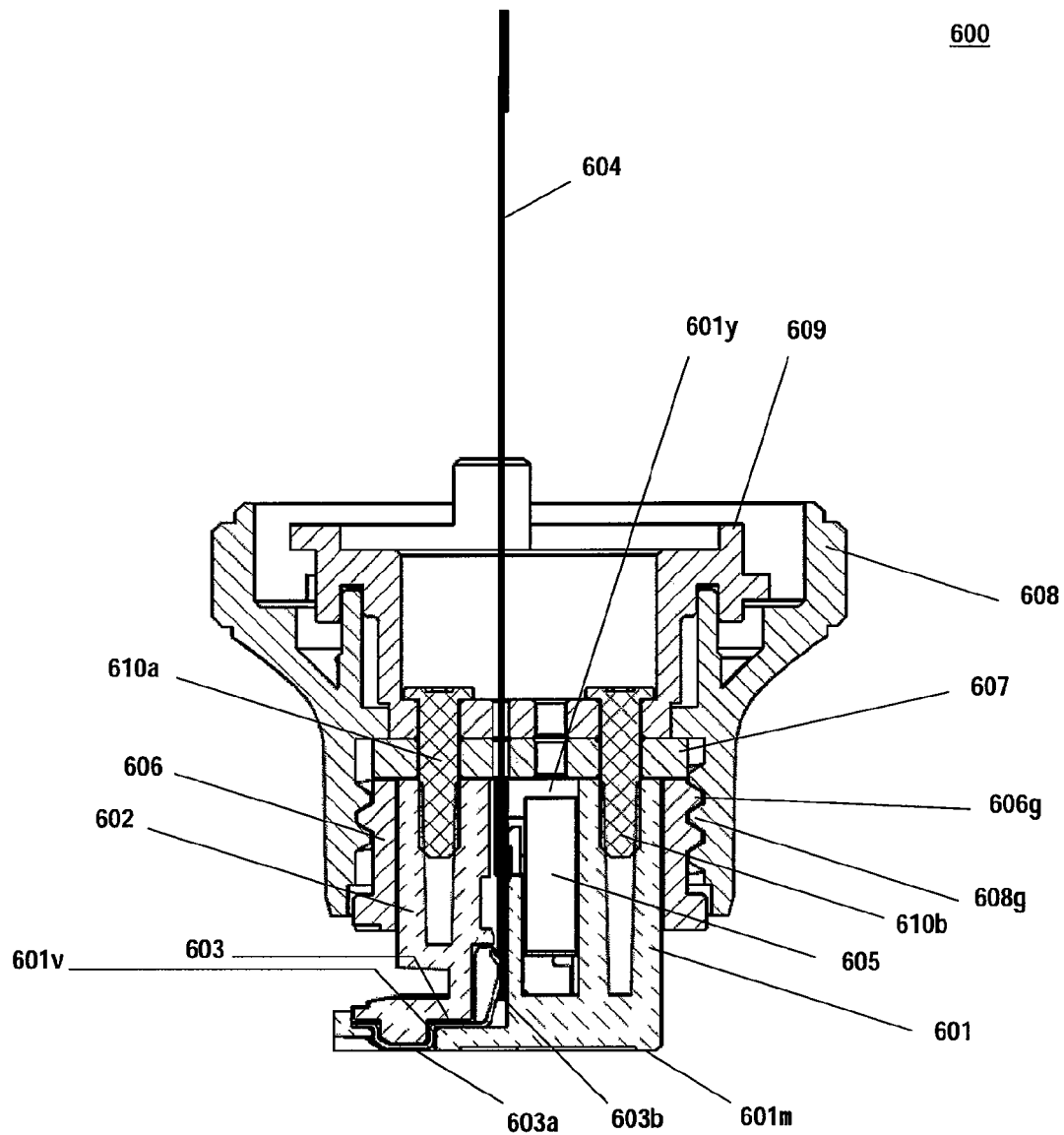
FIG. 11 is a cross-sectional view of a connection part of an accessory device in the present embodiment.
Figure 12:
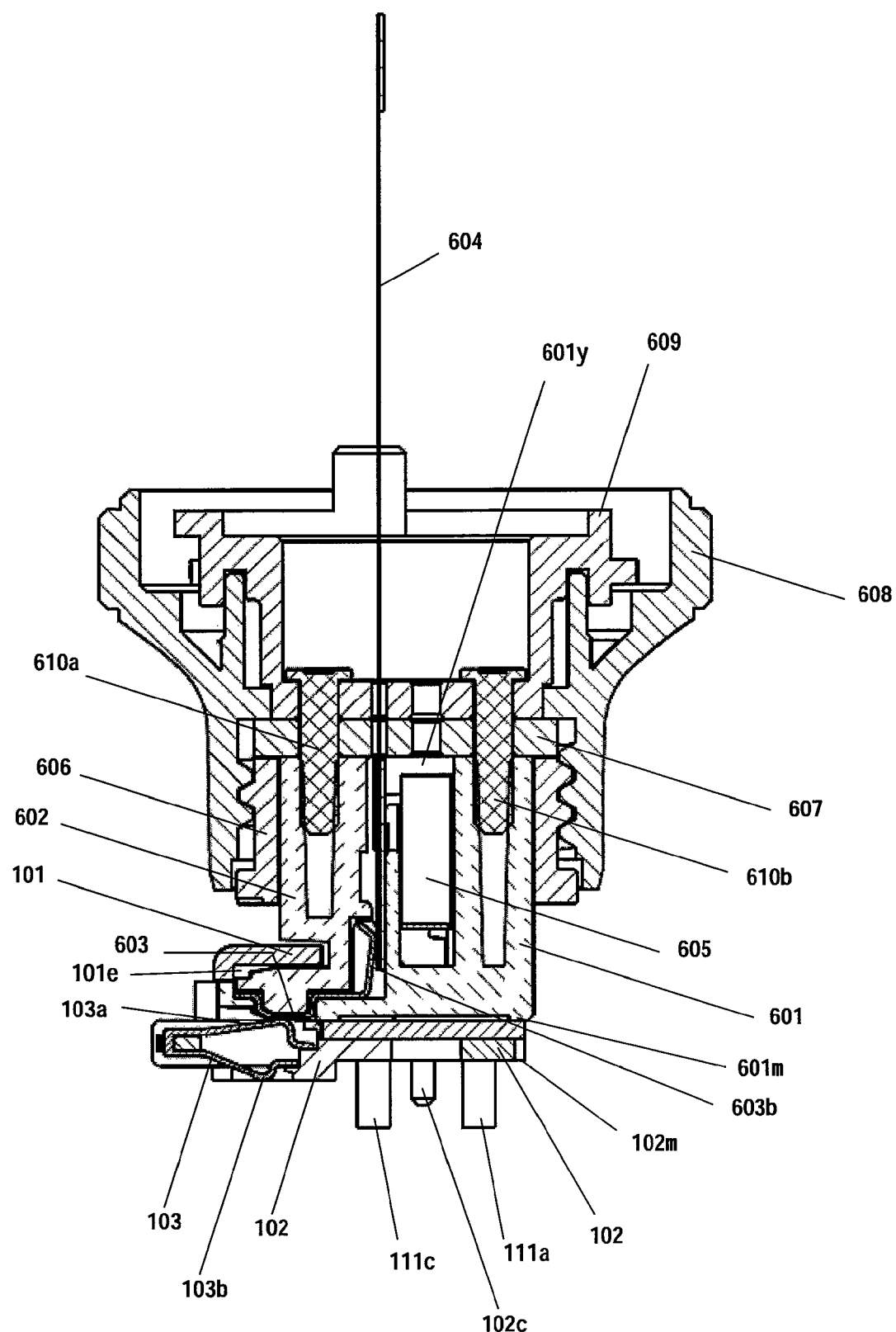
FIG. 12 is a cross-sectional view showing a state where a connection part of an accessory device is mounted on a video camera in the present embodiment.

FIG. 11 is a cross-sectional view of the connection part of the accessory device. FIG. 12 is a cross-sectional view showing the state where the connection part (the shoe mounting part) 600 of the accessory device is mounted on the accessory shoe of the video camera main body 100.

In the following description, a direction corresponding to a left side of the cross section of FIGS. 11 and 12 (a first direction) is referred to as a "front", and a direction corresponding to a right side of FIGS. 11 and 12 (a second direction) is referred to as a "back". Here, the "front" is a direction corresponding to an object direction for the video camera main body 100 (the first direction), and shows a mounting direction in which the connection part 600 of the accessory device slides to be mounted on the accessory shoe.

A video light or a flash light for illuminating the object, the microphone can be used for recording voices and be used for recording images, or a GPS device is used as the accessory device. The accessory device is not limited to this, and other accessory devices can also be used.

In FIGS. 7 to 11, reference numeral 601 denotes an accessory side contact holding member, and is made of a thermoplastic resin material such as PBT or PA. Generally, the accessory side contact holding member 601 is integrally formed by injection molding.

The accessory side contact holding member 601 (an insertion member) holds an accessory side contact 603 described later, and is configured to be inserted in a first direction with respect to the sliding space 101*s* between a first engagement part and a second engagement part of the accessory shoe. The first direction is a direction in which the accessory device slides for connecting the accessory device with the accessory shoe. Therefore, the camera side engagement part (a third engagement part) 101*c* is placed at a position anterior to the camera side engagement part (the first engagement part) 101*a* and the camera side engagement part (the second engagement part) 101*b* in the first direction.

Reference numeral 602 denotes an accessory side cover member, and similarly to the accessory side contact holding member 601, is made of a thermoplastic resin material such as PBT or PA. Generally, the accessory side cover member 602 is integrally formed by injection molding.

Reference numeral 603 denotes an accessory side contact. The accessory side contact 603 is made of a metal material such as phosphor bronze or copper-titanium alloy which has superior spring characteristics and conductivity. The accessory side contact 603 is integrally formed by the punching process and/or the bending process. After that, a surface treatment such as nickel plating or gold plating is performed. The accessory side contact 603 is a contact for electrically connecting the video camera main body 100 (the image pickup apparatus).

Hereinafter, the configuration of the connection part 600 of the accessory device will be described in more detail.

The accessory side contact holding member 601 is provided with accessory side engagement parts 601*a*, 601*b*, 601*c*, and 601*d* as well as a contact holding part 601*x* which holds the accessory side contact 603.

The accessory side engagement parts 601*a* and 601*b* are provided at the right and the left of the back part of the accessory side contact holding member 601. Here, "the right and the left" is a direction corresponding to the shoe width direction described above. In the following description, this direction is referred to as an accessory width direction.

The accessory side engagement parts 601*a* and 601*b* are inserted between end parts of the camera side engagement parts 101*a* and 101*b* extending in parallel to the sliding part 101*d* (hereinafter referred to as a "bent end part") and the sliding part 101*d*. The accessory side engagement parts 601*a* and 601*b* engage with the camera side engagement parts 101*a* and 101*b* by being inserted between the bent end parts of the camera side engagement parts 101*a* and 101*b* and the sliding part 101*d*.

Thus, the back part of the accessory side holding part 601 is held by the accessory shoe (the camera side engagement plate 101), and the motion in the accessory width direction and the accessory height direction is limited.

The contact holding part 601*x* is provided at a front part of the accessory side contact holding member 601. The contact holding part 601*x* is provided with partition walls for preventing adjacent accessory side contacts 603 from shorting circuit and holds the accessory side contacts 603 at predetermined pitches in the accessory width direction.

Guide wall surfaces 601*n* and 601*o* are formed on both side surfaces of the contact holding part 601*x* in the accessory width direction. The guide wall surfaces 601*n* and 601*o* are wall surfaces which straight extend from a position where the accessory side engagement parts 601*a* and 601*b* are formed to the front. In other words, the guide wall surfaces 601*n* and 601*o* extend in a front direction with a predetermined width in parallel to the guide wall surfaces of the accessory side engagement parts 601*a* and 601*b* in the accessory width direction.

Furthermore, accessory side engagement parts 601c and 601d are formed on an upper part of both sides in the accessory width direction of the contact holding part 601x which sandwiches the plurality of accessory side contacts 603. The accessory side engagement parts 601c and 601d are inserted in an engagement space 101t formed under the camera side engagement part 101c with the contact holding part 601x and engage with the camera side engagement part 101c.

As described above, an accessory side connector is constituted by the contact holding part 601x and the accessory side contact 603, and the front part of the accessory side contact holding part 601 is held by the accessory shoe (the camera side engagement plate 101).

A concave part 601z is formed on the lower surface at the front side of the accessory side contact holding member 601. The concave part 601z is provided with a plurality of holes 601v which expose contact parts 603a of the plurality of accessory side contacts 603.

A pair of convex parts 601u is formed on the upper surface at a back end of the accessory side contact holding member 601. When the connection part 600 of the accessory device attempts to be inserted in a direction opposite to a correct direction with respect to the camera side engagement plate 101, the insertion is prevented by contact on hack edge surfaces of the camera side engagement parts 101a and 101b.

The accessory side cover member 602 is attached to the accessory side contact holding member 601 so as to cover upper surfaces of the contact holding part 601x and the accessory side contacts 603. The accessory side cover member 602 protects the accessory side contacts 603 and prevents the accessory side contacts 603 from being removed.

The accessory side contact 603 is provided with a contact part 603a which is in contact with the camera side contact 103 (the contact part 103a) at one end, and is provided with a contact part 603b which is in contact with an FPC 604 described later at the other end. The accessory side contact 603 is in contact with the FPC 604 described later and has a role of supplying power to a control board inside the accessory device and exchanging communication signals. The contact part 603a is in contact with the contact part 103a described above at a predetermined contact pressure, and the contact part 603b is in contact with the FPC 604 at a predetermined contact pressure.

The FPC 604 supplies a power supply voltage supplied from a side of the video camera main body 100 to a control board (not shown) provided in the accessory device, and exchanges communication signals between the control board and the video camera main body 100.

Reference numeral 605 denotes a substantially M-shaped click spring. The click spring 605 is made of a metal material such as SUS or beryllium copper which has superior spring characteristics, and is integrally formed by the punching process and/or the bending process. The click spring 605 is stored in a storage part 601y provided at the accessory side contact holding member 601. The lower end part of the click spring 605 is protruded to the upper parts of the accessory side engagement parts 601a and 601b through an opening 601t formed on the lower surface of the storage part 601y.

When the connection part 600 of the accessory device is mounted on (inserted in) the accessory shoe, the click spring 605 is in contact with the end surfaces of the bent end parts of the camera side engagement parts 101a and 101b and is elastically deformed to slide on the inner end surface.

When the connection part 600 of the accessory device is inserted up to a predetermined mounting position with respect to the accessory shoe, a click feel is generated by falling the click spring 605 into the concave parts 101u and 101v provided in the vicinity of the camera side engagement parts 101a and 101b. Therefore, a user can recognize that the connection part 600 of the accessory device is inserted up to a predetermined position with respect to the accessory shoe, and a mounting error can be avoided.

Reference numeral 606 denotes a locking member (a moving member). The locking member 606 is made of a thermoplastic resin material such as PC or ABS, and generally is integrally formed by injection molding. The locking member 606 is provided with a plurality of protrusions 606a, 606b, 606c, and 606d (contact surfaces) and a plurality of small protrusions 606e and 606f (protrusion parts).

In the present embodiment, all of the contact surfaces and the protrusion parts are integrally formed with the locking member 606, but is not limited to this. The protrusions 606a and 606b among the contact surfaces are provided with small protrusions 606e and 606f (protrusion parts), respectively. Thus, in the present embodiment, the protrusion parts are protruded from the contact surfaces. However, instead of this, the protrusion parts can also be formed differently from the contact surfaces.

A guide surface (not shown) provided inside the locking member 606 (the moving member) engages with a guide surface which is provided on the accessory side contact holding member 601 and the accessory side cover member 602. Thus, the locking member 606 is linearly movable only in a substantially upward and downward direction.

Reference numeral 608 denotes a locknut (an operating member) which is rotatable. The locknut 608 is made of a thermoplastic resin material such as PC or ABS, and generally is integrally formed by injection molding. Furthermore, what is called, a knurled part 608a is formed at the upper side of the outer periphery for improving the operability by a user, and a female screw 608g is formed at the inner periphery.

Reference numeral 607 denotes an intermediate member which is positioned by engaging with a positioning dowel provided on each of upper surfaces of the accessory side contact holding member 601 and the accessory side cover member 602. The intermediate member 607 limits the movement of the locknut 608 in a downward direction, and it enables the locknut 608 to move only in a rotational direction.

A male screw 606g is formed at the outer periphery of the locking member 606 and is screwed into the female screw 608g which is formed on the inner periphery surface of the locknut 608. By such a configuration, the locking member 606 is movable in an upward and downward direction by the rotation of the locknut 608. The upward and downward direction in FIG. 7 is, in other words, a direction (a second direction) which intersects with a direction (a first direction) in which the accessory side contact holding member 601 is inserted with respect to the accessory shoe.

When the locknut 608 is rotatably operated and the locking member 606 is linearly moved in a third direction (in a downward direction which is closer to the accessory shoe), the protrusions 606a, 606b, 606c, and 606d (the contact surfaces) are in contact with the upper surfaces of the camera side engagement parts 101a, 101b, and 101c. In the present embodiment, the protrusion 606a among the contact surfaces is in contact with the camera side engagement part 101a (a first engagement part), and the protrusion 606b is in contact with the camera side engagement part 101b (a second engagement part). The protrusions 606c and 606d among the contact surfaces are in contact with the camera side engagement part 101c (a third engagement part).

The protrusions 606a, 606b, 606c, and 606d (the contact surfaces) are tightly in contact with the upper surfaces of the camera side engagement parts 101a, 101b, and 101c by further fastening the locknut 608 in this state.

On the other hand, the small protrusions 606e and 606f (the protrusion parts) fall in a groove G which is formed between the camera side engagement parts 101a and 101b and the camera side engagement part 101c (protrude into the groove). Therefore, even if the fixing strength is loosened and the accessory device attempts to slide in the second direction, the sliding in the second direction is prevented because the protrusion parts are in contact with the side surfaces of the first engagement part and the second engagement part. Thus, the protrusion parts of the accessory device of the present embodiment are in contact with the first engagement part and the second engagement part so as to prevent the accessory device from sliding in the second direction.

The small protrusion 606e of the present embodiment protrudes between the camera side engagement part 101a (the first engagement part) and the camera side engagement part 101c (the third engagement part) by the locking member 606 moving in a direction of closer to the accessory shoe (a third direction). Similarly, the small protrusion 606f protrudes between the camera side engagement part 101b (the second engagement part) and the camera side engagement part 101c (the third engagement part).

Thus, even if the locknut 608 is rather loosened, it does not happen that the connection part 600 of the accessory device is removed from the camera side engagement plate 101 and the accessory device falls. Therefore, the accessory device can be stably reliably mounted.

Reference numeral 609 denotes a connection member. The connection member 609 is made of a thermoplastic resin material such as PC or ABS, and generally is integrally formed by injection molding. A positioning engagement hole for the intermediate member 607 and through holes that fixing screws 610a and 601b pass through are provided inside the connection member 609. By the configuration, a position relation of the connection member 609 relative to the intermediate member 607 is determined, and the connection member 609 is fixed on the accessory side contact holding member 601 and the accessory side cover member 602.

A fixing dowel which is used for the attachment to a main body of the accessory device is formed on the upper part of the connection member 609, and it is connected to and fixed on the main body of the accessory device (not shown). When the connection member 609 is fixed on the accessory side contact holding member 601 and the accessory side cover member 602, the movement of the locknut 608 in an upward direction is limited. In this case, the locknut 608 is movable only in a rotational direction.

Figure 13:
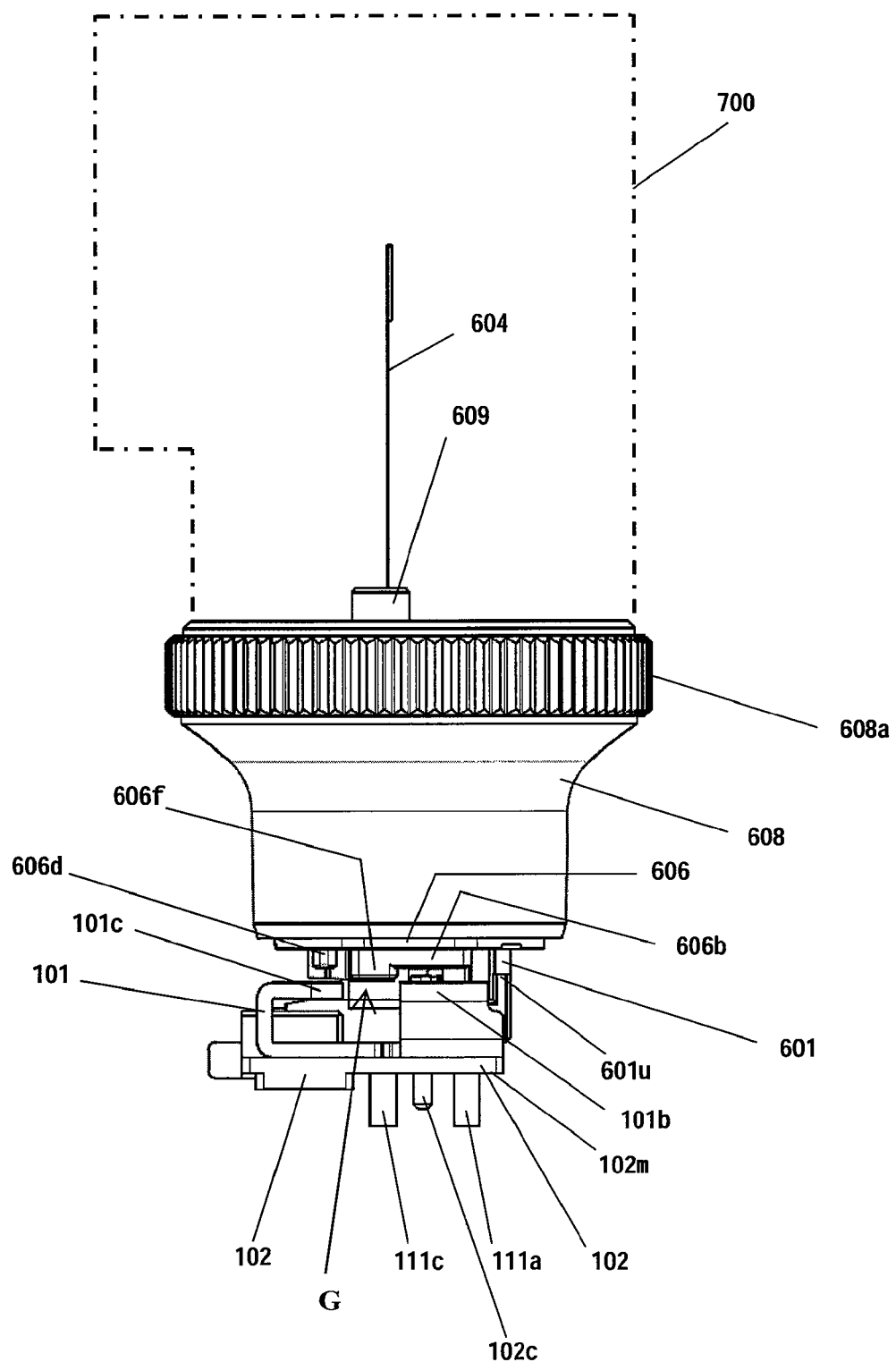
FIG. 13 is a side view showing a sliding completed state of a connection part of an accessory device in the present embodiment.
Figure 14:
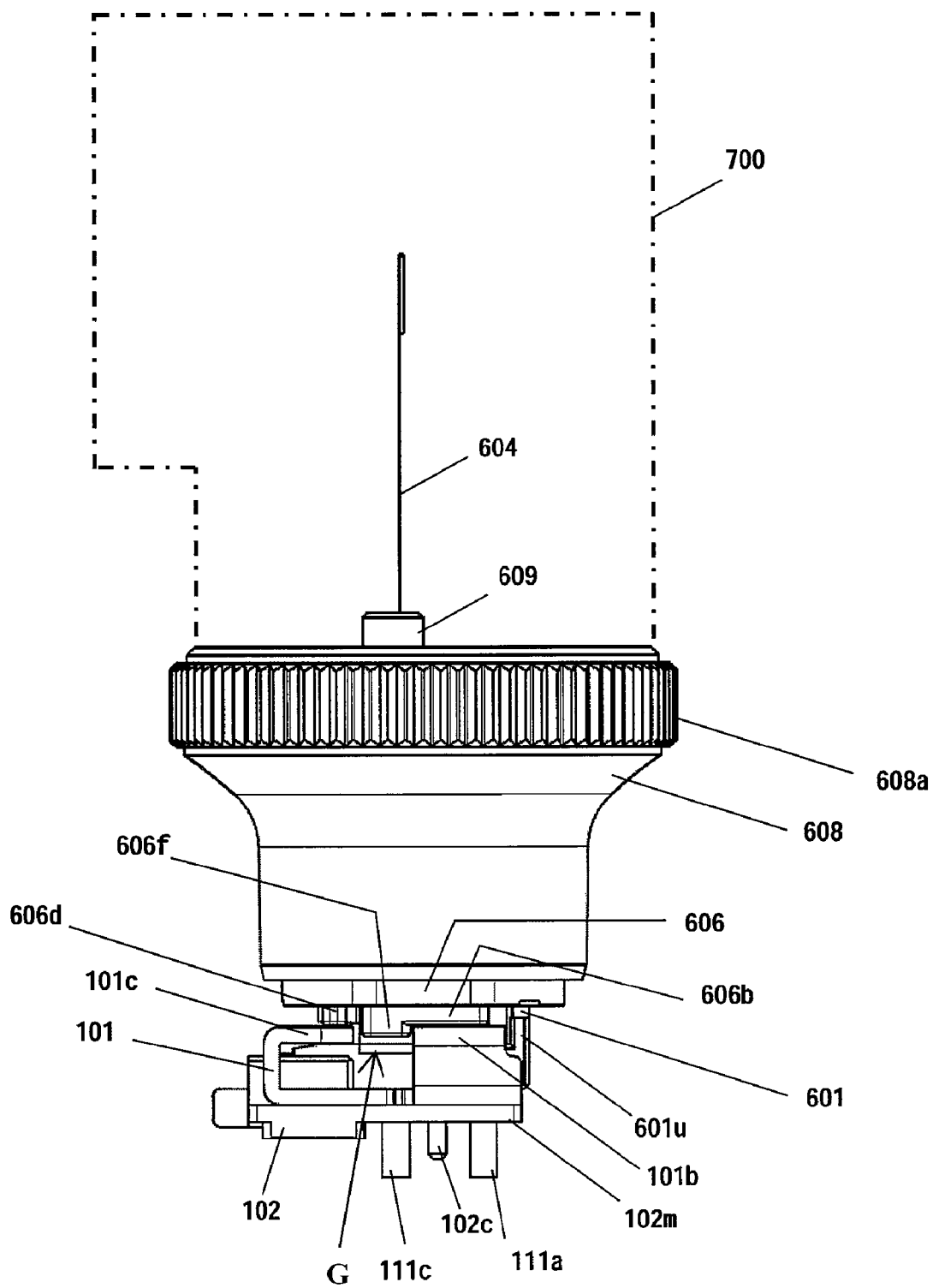
FIG. 14 is a side view showing a mounting completed state of a connection part of an accessory device in the present embodiment.

A shoe mounting part (a connection part 600 of the accessory device) constituted as described above is mounted on the accessory shoe of the video camera main body 100 as shown in FIGS. 12 to 14. FIG. 12 is a cross-sectional view showing a state where the connection part of the accessory device is mounted on the video camera. FIG. 13 is a side view showing a sliding completed state of the connection part of the accessory device. FIG. 14 is a side view showing a mounting completed state of the connection part of the accessory device. In FIGS. 13 and 14, the outline of an accessory device main body 700 (a video light) is shown by a dotted line.

Next, a procedure of mounting the shoe mounting part (the connection part 600 of the accessory device) for the accessory shoe will be described.

First, the lock member 606 moves up to a predetermined position in an upward direction (a direction away from the accessory shoe) by the rotational operation of the locknut 608 before the shoe mounting part (the connection part 600 of the accessory device) is mounted on the accessory shoe. The predetermined position is a position where the locknut 608 can not be rotated any more after the rotational operation of the locknut 608.

Figure 15:
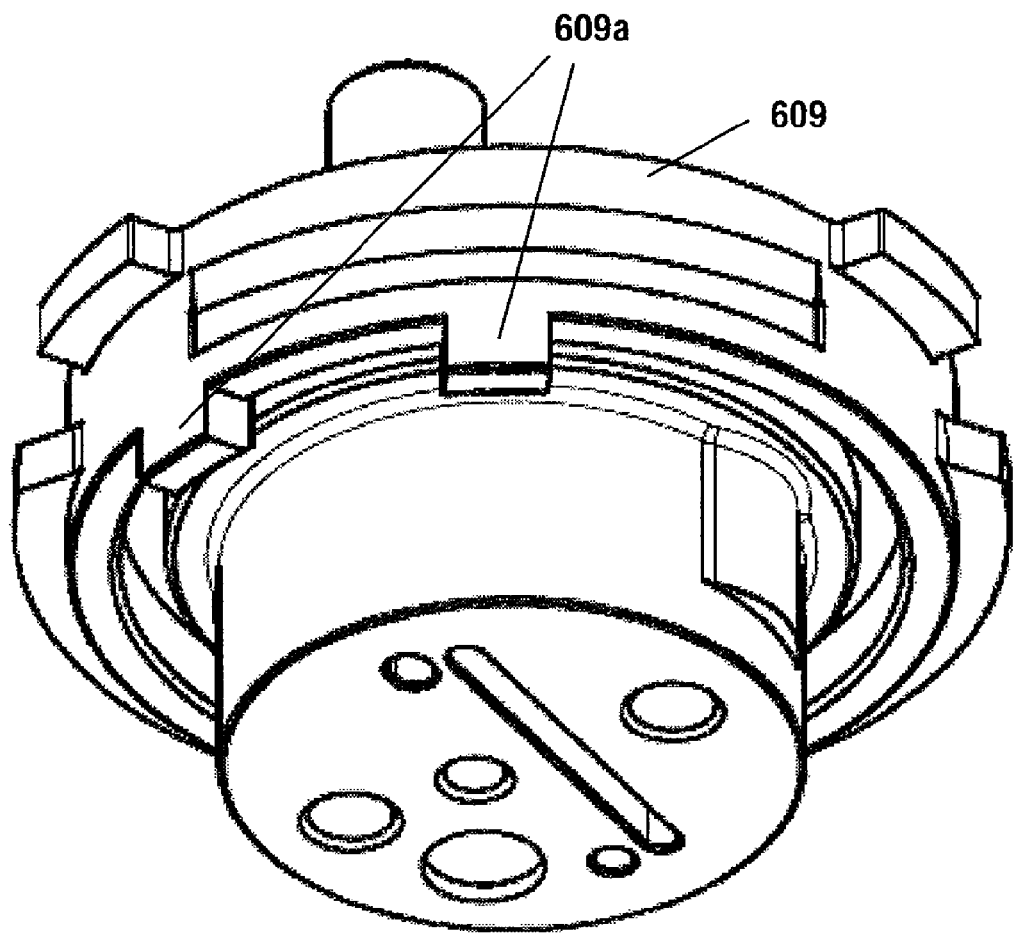
FIG. 15 is a perspective view of a connection member in the present embodiment.
Figure 16A:
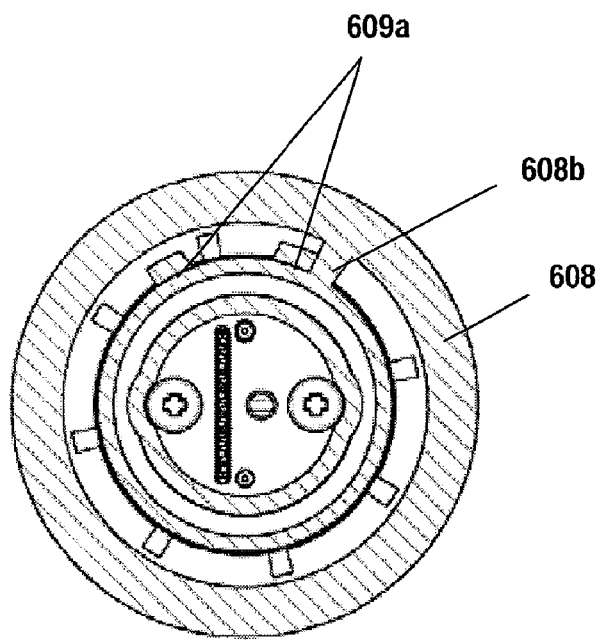
FIG. 16A is a plan view showing a state where a rotation of a locknut stops in the present embodiment.
Figure 16B:
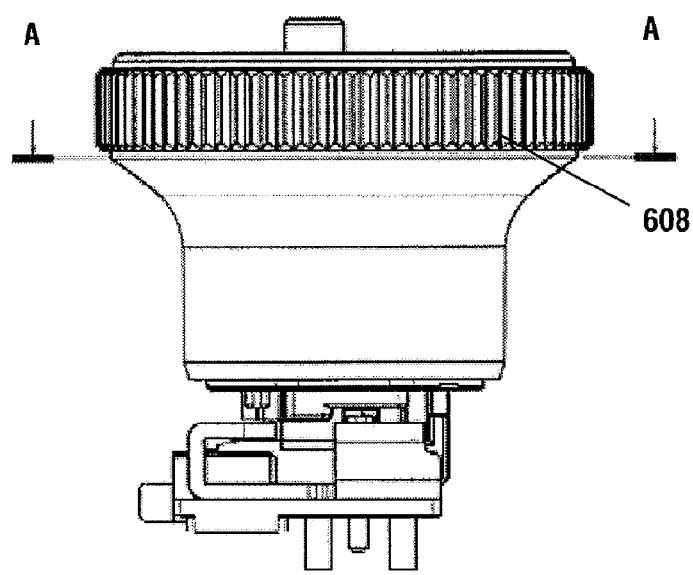
FIG. 16B is a side view showing a state where a rotation of a locknut stops in the present embodiment.
Figure 17:
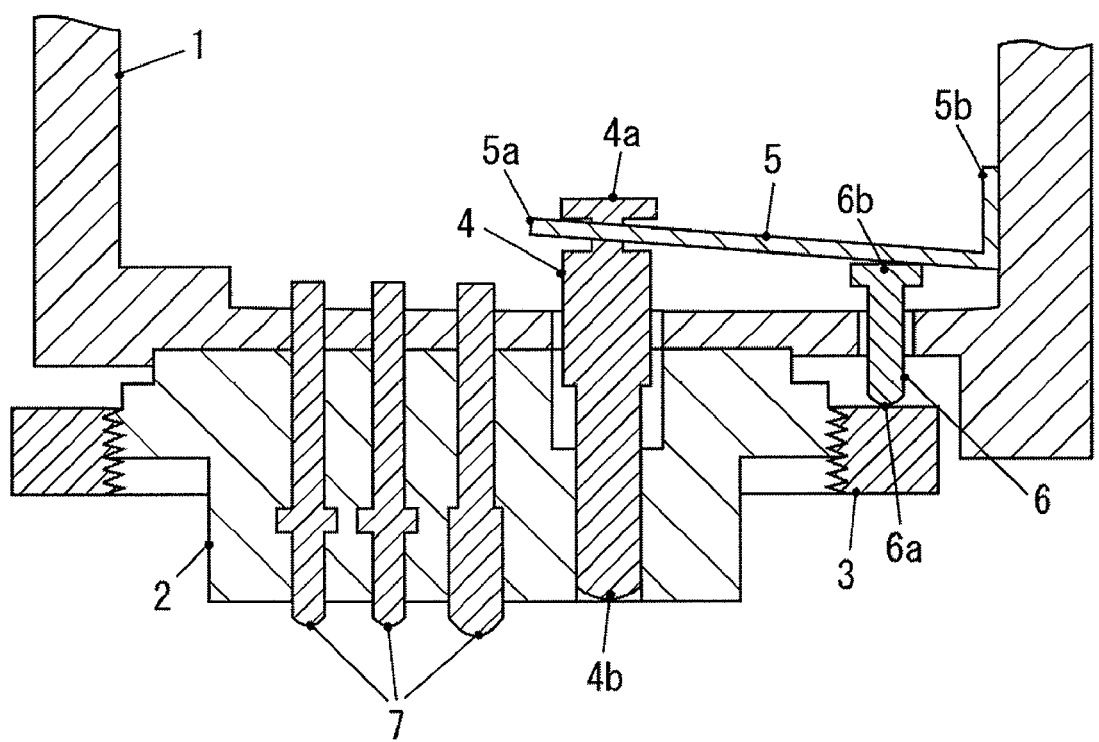
FIG. 17 is a main cross-sectional view of a connection mechanism in a conventional accessory device.

This state is shown in FIGS. 15 and 16. FIG. 15 is a perspective view of the connection member 609. As shown in FIG. 15, the connection member 609 is provided with a first rotation stopper 609a. FIG. 16A is a plan view of the connection part of the accessory device at the predetermined position described above, and FIG. 16B is a side view of the connection part. FIG. 16A shows a cross-sectional plane which is cut at A-A in FIG. 16B. The first rotation stopper 609a of the connection member 609 is in contact with a second rotation stopper 608b of the locknut 608. Therefore, the locknut can not rotate any more.

As shown in FIG. 13, at the predetermined position described above, the small protrusions 606e and 606f provided on the locking member 606 are positioned over the camera side engagement plate 101. Therefore, the small protrusions 606e and 606f do not protrude between the camera side engagement part 101a (the first engagement part) and the camera side engagement part 101c (the third engagement part) and between the camera side engagement part 101b (the second engagement part) and the camera side engagement part 101c (the third engagement part) In other words, the small protrusions 606e and 606f are not in contact with a front side end surface of the camera side engagement parts 101a and 101b. Therefore, the connection part 600 of the accessory device can be inserted into the camera side engagement plate 101.

Next, the positions of the accessory side contact holding member 601 and the accessory shoe are positioned so that a lower surface 601m of the accessory side contact holding member 601 faces the sliding part 101d provided at the camera side engagement plate 101. In this case, an accessory side connector (a front part of the accessory side contact holding member 601) is positioned over the sliding space 101s between the camera side engagement parts 101a and 101b. Thus, the accessory side engagement parts 601a and 601b are positioned at the slightly back and upper side. Hereinafter, this state is referred to as a pre-mounting preparation state.

As shown in FIG. 4, a gap between the camera side engagement parts 101a and 101b of the accessory shoe in the shoe width direction (a gap between the bent end parts of the camera side engagement parts 101a and 101b, hereinafter referred to as a "gap of the camera side engagement parts") is represented as W1. A width of the camera side connector (the contact holding member 102x and the camera side contact 103) in the shoe width direction, i.e. a width between the guide wall surfaces 102n and 102o (hereinafter referred to as a "width of the camera side connector") is represented as W2. Furthermore, a length from a back end of the guide wall surfaces 102n and 102o to a back end of the camera side engagement parts 101a and 101b in a frontward and backward direction (hereinafter referred to as a "sliding space length") is represented as L1.

On the other hand, as shown in FIG. 8, a width of the accessory side connector (the contact holding part 601x and the accessory side contact 603) in an accessory width direction, i.e. a width between the guide wall surfaces 601n and 601o (hereinafter referred to as a "width of the accessory side connector") is represented as W2'. Furthermore, a length from a front end of the accessory side engagement parts 601a and 601b of the accessory side contact holding member 601 to a front end of the accessory side connector (hereinafter referred to as a "length of the accessory side connector") is represented as L'.

In this case, the width of the camera side connector W2 and the width of the accessory side connector W2' are set to, what is called, a fitting dimension. The gap of the camera side engagement parts W1 is set to be greater than the width of the accessory side connector W2', i.e. greater than the width of the camera side connector W2. The sliding space length L1 is set to be slightly shorter than the length of the accessory side connector L1'.

Thus, in the present embodiment, the gap of the camera side engagement parts W1 is set to be greater than the width of the accessory side connector W2'.

Therefore, when the shoe mounting part moves from the pre-mounting preparation state described above to a downward direction (a direction of closer to the accessory shoe), the accessory side connector passes a space between the camera side engagement parts 101a and 102b and is inserted into the sliding space 101s.

Since the length of the accessory side connector L1' is slightly longer relative to the sliding space length L1, the front end of the accessory side connector can also be close to the camera side engagement part 101c. Hereinafter, this state is referred to as a "pre-sliding state".

In other words, the gap of the camera side engagement parts W1 is set to a width where the accessory side connector having the width of the accessory side connector W2' can pass. Therefore, the overlap of the shoe mounting part in the pre-mounting preparation state and the pre-sliding state and the accessory shoe can be enlarged.

The accessory side connector is inserted into the engagement space 101t formed between the camera side engagement part 101c and the camera side connector and engages with the camera side engagement part 101c by sliding the shoe mounting part at the pre-sliding state in a frontward direction. The accessory side engagement parts 601a and 601b are inserted between the camera side engagement parts 101a and 101b and the sliding part 101d and engage with the camera side engagement parts 101a and 101b.

When the accessory side connector is inserted in the engagement space 101t completely and is in contact with a part of a front wall of the camera side engagement part 101c, the contact part 603a of the accessory side contact 603 is in contact with the contact part 103a of the camera side contact 103.

As shown in FIG. 12, in the above state, the end part of the accessory side connector is immediately beneath the opening 101e. Therefore, even if a force which tips the accessory device backward is applied for example, it will not happen that only the camera side engagement part 101c deforms.

Furthermore, since the click feel is generated by the click spring 605, the user can learn that the accessory device is adequately mounted.

Subsequently, the locking member 606 moves in a downward direction (a direction of closer to the accessory shoe) by the rotational operation of the locknut 608. Therefore, the protrusions 606a, 606b, 606c, and 606d provided on the lower surface of the locking member 606 press each of the upper surfaces of the camera side engagement parts 101a, 101b, and 101c.

With the motion described above, the small protrusions 606e and 606f are protruded into grooves which are formed between the camera side engagement parts 101a and 101b and the camera side engagement part 101c, and are inserted into the grooves. Therefore, even if the accessory device attempts to move in a backward direction, the movement is prevented by the small protrusions 606e and 606f. The state in this case is shown in FIG. 14.

In accordance with the operation described above, mounting the accessory device on the video camera main body 100 is completed.

Subsequently, the video camera main body 100 recognizes that the accessory device is mounted, and the power supply from the video camera main body 100 to the accessory device and the communication of signals between them start. If the accessory device needs to be removed from the video camera main body 100, an operation opposite to the above operation may be performed.

As described above, in the present embodiment, the protrusions 606a, 606b, 606c, and 606d are pressed and fixed on the camera side engagement parts 101a and 101b by the rotational operation of the locknut 608 to move the locking member 606 in a downward direction. In addition, in the fixing state described above, the small protrusions 606e and 606f are protruded into the grooves which are formed between the camera side engagement parts 101a and 101b and the camera side engagement part 101c and are inserted into the grooves.

Therefore, even if the locknut 608 is not adequately fastened or it is somewhat loosened during use of the accessory device, the accessory device is effectively prevented from falling from the video camera main body 100. As a result, the accessory device can be stably reliably mounted.

The present embodiment describes an example that two small protrusions 606e and 606f are inserted into grooves formed between the camera side engagement parts 101a and 101b and the camera side engagement part 101c. However, the same effect can be obtained even when the locking member 606 is provided with only the small protrusion 606f and the small protrusion 606f is inserted into the groove formed between the camera side engagement part 101b and the camera side engagement part 101c, instead of the above example.

Unlike the construction of the conventional shoe mounting part, the locknut 608 that is a rotational operation part is not configured to be fastened to the camera side engagement plate 101. Therefore, for example, it can be applicable even when the camera side engagement plate 101 is buried in the video camera main body 100. Accordingly, the design freedom of the video camera main body 100 is dramatically improved and the video camera main body 100 can be miniaturized.

As described above, according to the present embodiment, an accessory device which is configured to be reliably connected to an accessory shoe with a simple configuration can be provided. Even if the rotational member of the accessory device is somewhat loosened, the accessory device does not easily fall. Therefore, according to the present embodiment, an accessory device equipped with a highly reliable connection part can be provided.

The present invention can also be applied to other image pickup apparatuses such as a single-lens reflex camera and a compact camera, which are apparatuses other than a video camera equipped with an accessory shoe.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-333410, filed on Dec. 26, 2007, which is hereby incorporated by reference herein in its entirety.

What is claimed is:

1. An accessory device configured to be mounted on an accessory shoe of an image pickup apparatus, the accessory device comprising:

an insertion member configured to be inserted in an engagement space around by a first engagement part, a second engagement part and a third engagement part of the accessory shoe, the insertion member holds a contact for electrically connecting a contact part of the image pickup apparatus which is provided in the engagement space;

an operating member configured to perform an operation for fixing the accessory device on the accessory shoe in a state where the insertion member is inserted in the engagement space; and a moving member configured to move in a second direction intersecting with a first direction in which the insertion member is inserted in the engagement space by the operation of the operating member, wherein the third engagement part is formed in a direction opposite to the first direction to cover the contact part of the image pickup apparatus which is provided in the engagement space, and wherein the moving member is provided with a protrusion part which is in contact with at least one of a groove formed between the first engagement part and the third engagement part and a groove formed between the second engagement part and the third engagement part so that the insertion member is not removed from the engagement space by a movement of the moving member in the second direction.

2. An accessory device according to claim 1, wherein the moving member is provided with a contact surface which is in contact with at least one of the first engagement part and the second engagement part by the movement of the moving member in the second direction.

* * * * *